(12) United States Patent
Sharratt et al.

(10) Patent No.: US 9,376,790 B2
(45) Date of Patent: Jun. 28, 2016

(54) FLOW DIVERTER AND OPERATION OF SAME

(71) Applicant: WAXMAN CONSUMER PRODUCTS GROUP INC., Bedford Heights, OH (US)

(72) Inventors: Jason A. Sharratt, Wadsworth, OH (US); Matthew Smith, Wooster, OH (US); Mitchell Bailey, Westlake, OH (US)

(73) Assignee: Waxman Consumer Products Group Inc., Bedford Heights, OH (US)

( * ) Notice: Subject to any disclaimer, the term of this patent is extended or adjusted under 35 U.S.C. 154(b) by 112 days.

(21) Appl. No.: 14/152,454

(22) Filed: Jan. 10, 2014

(65) Prior Publication Data

US 2014/0196806 A1 Jul. 17, 2014

Related U.S. Application Data

(60) Provisional application No. 61/751,579, filed on Jan. 11, 2013.

(51) Int. Cl.
*E03C 1/02* (2006.01)
*F16K 11/074* (2006.01)

(52) U.S. Cl.
CPC ............... *E03C 1/023* (2013.01); *F16K 11/074* (2013.01); *Y10T 137/86501* (2015.04); *Y10T 137/86863* (2015.04)

(58) Field of Classification Search
CPC . E03C 1/023; E03C 1/021; Y10T 137/86501; Y10T 137/86871; Y10T 137/87708; Y10T 137/8773; Y10T 137/87804; Y10T 137/8782; Y10T 137/86509; Y10T 137/86517; Y10T 137/86533; Y10T 137/86541; Y10T 137/86566; Y10T 137/86863; Y10T 137/8671; Y10T 137/86558; Y10T 137/86992; F16K 31/44; F16K 31/46; F16K 31/53; F16K 31/535; F16K 11/074; F16K 11/0853
USPC .................. 251/230; 137/862, 865, 874, 876, 137/625.11, 625.12, 625.13, 625.15, 137/625.16, 625.19, 625.46, 625.47
See application file for complete search history.

(56) References Cited

U.S. PATENT DOCUMENTS

| | | | | |
|---|---|---|---|---|
| 863,782 | A * | 8/1907 | Callan | F16H 61/00 137/54 |
| 3,450,383 | A * | 6/1969 | Leverett | F16K 11/0833 137/625.14 |
| 6,217,761 | B1 | 4/2001 | Catanzaro et al. | |
| 7,077,150 | B2 | 7/2006 | McNerney | |
| 8,312,897 | B2 | 11/2012 | Niver | |
| 2013/0056095 | A1* | 3/2013 | Zhou et al. | 137/456 |

FOREIGN PATENT DOCUMENTS

WO WO2011140959 * 11/2011

* cited by examiner

*Primary Examiner* — Michael R Reid
(74) *Attorney, Agent, or Firm* — Tarolli, Sundheim, Covell & Tummino LLP

(57) ABSTRACT

A diverter assembly for a shower tub includes a housing having an inlet for receiving fluid and first and second outlets for discharging fluid. An endless advancement structure includes a flow plate fixed to the housing and a gearing arrangement rotatable relative to the flow plate. The flow plate includes a first opening in fluid communication with the first outlet and a second opening in fluid communication with the second outlet. The gearing arrangement includes third openings in fluid communication with the inlet. A handle is coupled to the gearing arrangement for selectively rotating the gearing arrangement in a single direction relative to the flow plate to alternate between placing the gearing arrangement in a first condition aligning one of the third openings with the first opening and placing the gearing arrangement in a second condition aligning one of the third openings with the second opening.

19 Claims, 8 Drawing Sheets

FLOW DIVERTER AND OPERATION OF SAME

CROSS REFERENCES TO RELATED APPLICATIONS

The following application claims priority to U.S. Provisional Patent Application Ser. No. 61/751,579 filed Jan. 11, 2013 entitled FLOW DIVERTER AND OPERATION OF SAME. The above-identified application is incorporated herein by reference in its entirety for all purposes.

TECHNICAL FIELD

The present disclosure relates to a flow diverter for fluids and operation of the same, and more specifically, a flow diverter having an endless advancement structure for diverting flow between at least two different flow paths.

BACKGROUND

The present disclosure relates to fluid control valves that divert fluid flow between different chambers or flow paths coupled to outlet fittings. Such diverters are found in bath tub/shower combinations wherein the outlet fittings may comprise a showerhead, handheld spray wand or tub-filling spout.

A tub-filling spout is typically positioned a few feet above the base of the tub, while the showerhead would be five or six feet above the base. The handheld spray wand may be used in combination with or in place of the showerhead. The handheld spray wand is typically positioned lower than the height of the showerhead, but is moveably coupled to a surrounding shower wall to allow for remote spraying by the user.

Conventional diverter valves direct water flow from a first outlet fitting such as a tub filler spout used to fill a tub when a bath is desired to a second outlet fitting for showering. Typically, the conventional diverter valves are positioned directly on the tub filler spout, allowing water to flow directly to the tub when open or in a first position. When the conventional diverter is manually actuated to a second position, the water flowing through the tub filler spout is blocked and the water flow is directed up to the showerhead and/or spray wand.

SUMMARY

One example embodiment of the present disclosure includes a diverter assembly for a shower tub arrangement that changes the distribution of water through two or more flow paths. The diverter assembly includes a housing having an inlet for receiving fluid and first and second outlets for discharging fluid from the housing. An endless advancement structure positioned within the housing includes a flow plate fixed to the housing and a gearing arrangement rotatable relative to the flow plate. The flow plate includes a first opening in fluid communication with the first outlet in the housing and a second opening in fluid communication with the second outlet in the housing. The gearing arrangement includes a plurality of third openings in fluid communication with the inlet of the housing. A handle is coupled to the gearing arrangement for selectively rotating the gearing arrangement relative to the flow plate in a single direction to alternate between placing the gearing arrangement in a first condition in which one of the plurality of third openings is aligned with the first opening in the flow plate and placing the gearing arrangement in a second condition in which one of the plurality of third openings is aligned with the second opening in the flow plate.

In accordance with another aspect of the invention a diverter assembly for a shower tub arrangement that changes the distribution of water through two or more flow paths includes a housing having an inlet for receiving fluid and first and second outlets for discharging fluid from the housing. An endless advancement structure positioned within the housing includes a flow plate fixed to the housing. The flow plate includes a first opening in fluid communication with the first outlet in the housing and a second opening in fluid communication with the second outlet in the housing. A gearing arrangement is rotatable relative to the flow plate and has a plurality of third openings in fluid communication with the inlet of the housing and a plurality of projections. Each projection includes a radially extending catch surface. First and second pins positioned in the housing are biased into engagement with the gearing arrangement. Engagement of the first pin with one of the catch surfaces places the gearing arrangement in a first condition in which one of the third openings is aligned with the first opening in the flow plate. Engagement of the second pin with one of the catch surfaces places the gearing arrangement in a second condition in which one of the third openings is aligned with the second opening in the flow plate. A handle coupled to the gearing arrangement selectively rotates the gearing arrangement in a single direction relative to the flow plate to alternate between placing the gearing arrangement in the first condition and second condition.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Referring now to the figures generally wherein like numbered features shown therein refer to like elements throughout the detailed description unless otherwise noted. The present disclosure relates to a flow diverter for fluids and operation of the same, and more specifically, a flow diverter having an endless advancement structure for diverting flow between at least two different flow paths.

Both residential and commercial establishments typically include a stand-alone shower and/or a bathtub equipped with a showerhead and tub-filling spout for bathing. In one example embodiment, the flow diverter assembly of the present disclosure is used to divert the fluid or water from the tub-filling spout to the showerhead or from the showerhead to the tub-filling spout.

Figure 1:
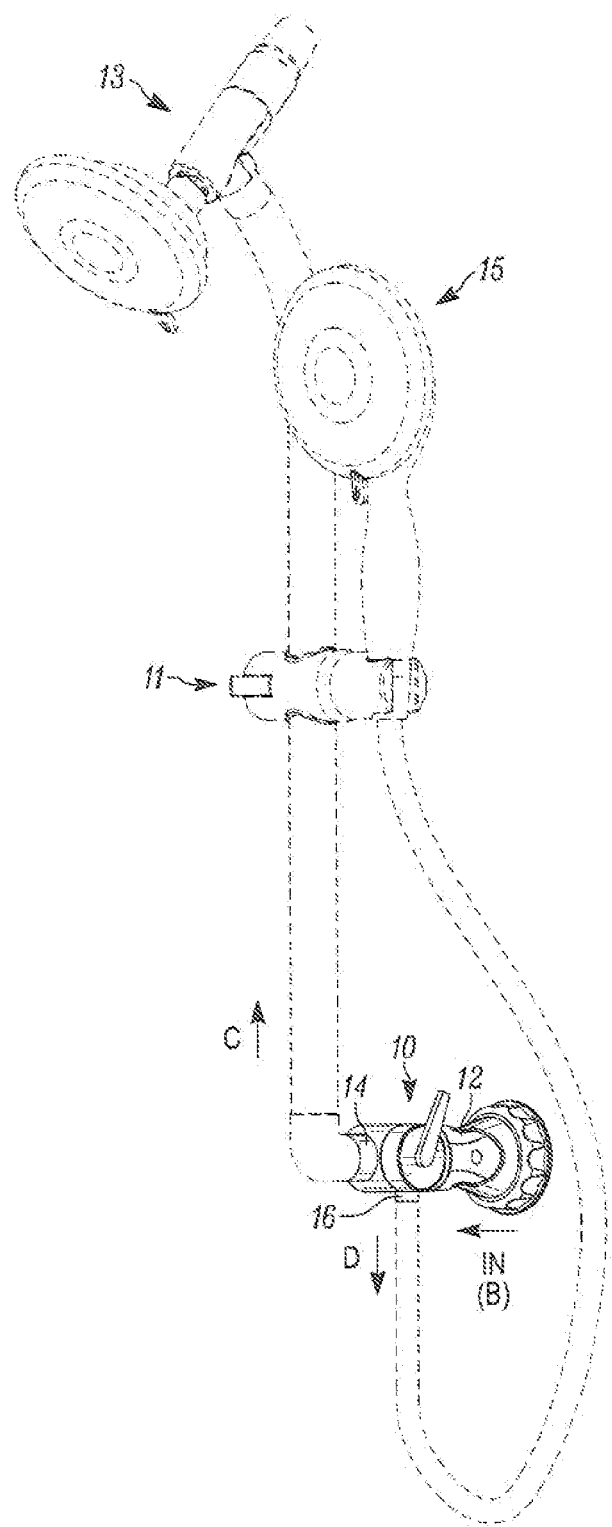
FIG. 1 is a schematic illustration of a diverter assembly constructed in accordance with one example embodiment of the present disclosure used in a shower/tub combination.

Referring now to the figures, and in particular to FIG. 1, a diverter assembly 10 constructed in accordance with one example embodiment of the present disclosure is shown implemented into a bath tub/shower combination 11 having a tub showerhead 13 and a handheld spray wand 15. Alternatively, the bath tub/shower combination 11 may include a tub-filling spout (not shown). The diverter assembly 10 is coupled to an inlet fitting 12 and first and second outlet fittings 14 and 16, respectively. In one example embodiment, the inlet fitting 12 is a water supply inlet pipe or is fluidly connected to the same. The first outlet fitting 14 is a pipe for supplying water to a showerhead 13 or is fluidly connected to the same. The second outlet fitting 16 is a pipe for supplying water to a spray wand 15 or is fluidly connected to the same. All three fittings 12, 14, and 16, are connected to or integrally formed with a housing 18.

Figure 2:
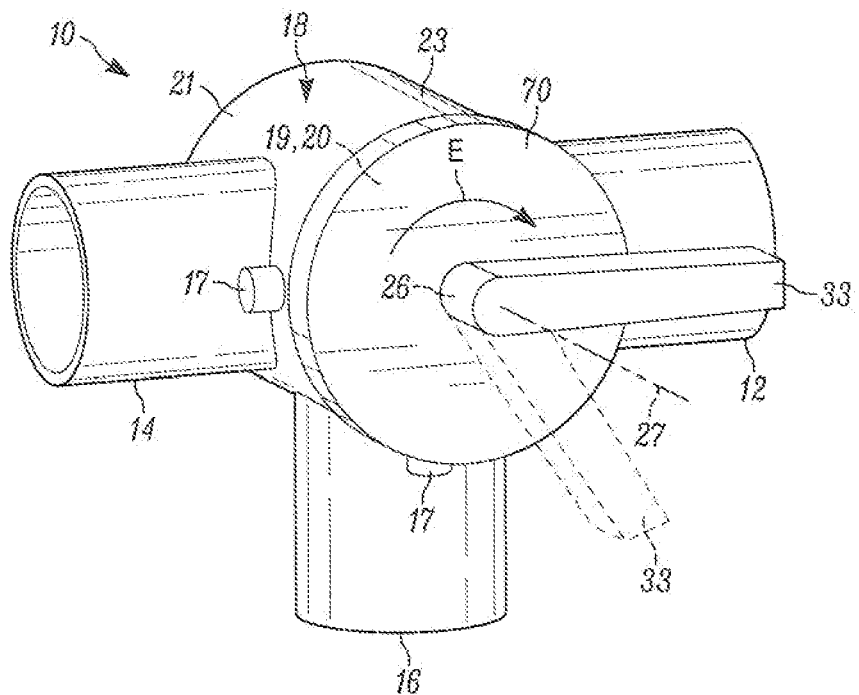
FIG. 2 is a front view of the diverter assembly of FIG. 1.
Figure 3:
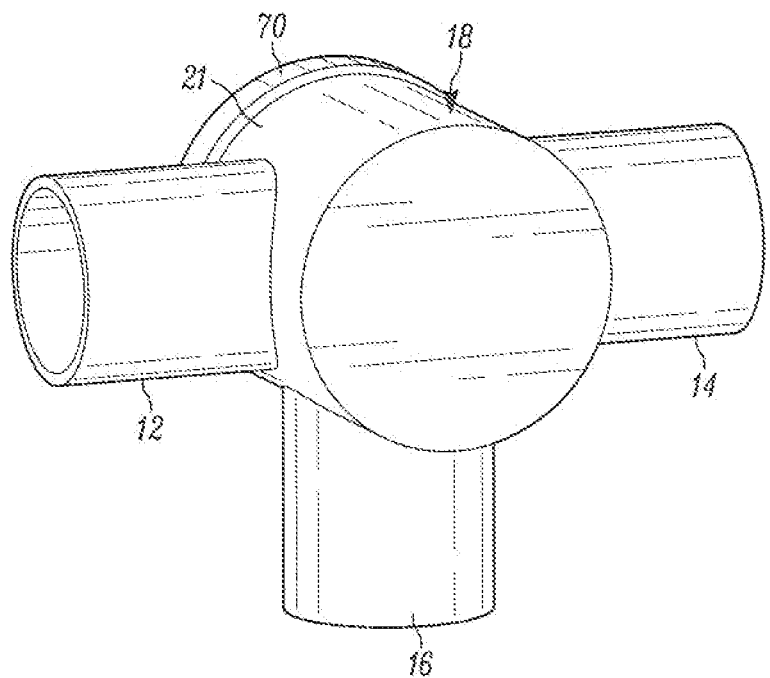
FIG. 3 is a rear view of the diverter assembly of FIG. 2.
Figure 4:
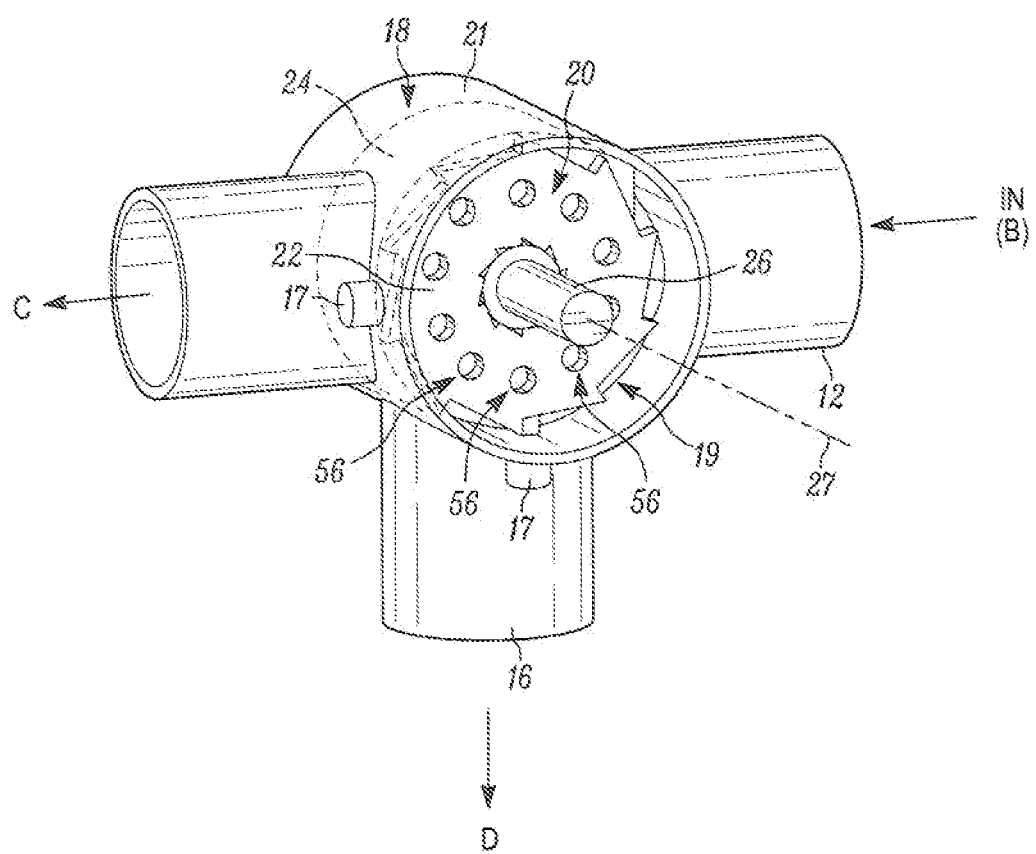
FIG. 4 is the front view of FIG. 1 with a portion of the diverter assembly removed.

As shown in FIGS. 2-4, the fittings 12, 14, 16 are arranged circumferentially about the housing 18 and extend generally perpendicularly to one another. It will be appreciated by those skilled in art, however, that the fittings 12, 14, and 16 could be interchanged with one another and/or have a different orientation about the housing 18 without departing from the spirit and scope of the present disclosure. Furthermore, it will be appreciated that the outlet fitting 14 could be connected to the spray wand 15 and the outlet fitting 16 could be connected to the showerhead 13 or a tub-filling spout (not shown).

The housing 18 is hollow and has a generally T-shaped construction having a wall 21 that defines an interior 19. The fittings 12, 14, 16 extend radially outwardly from the wall 21 to place the fittings in fluid communication with the interior 19 of the housing 18. The fittings 12, 14, 16 may be integrally formed with or secured to the wall 21 in a fluid-tight manner. An endless advancement structure 20 is positioned within the interior 19 of the housing 18 and is actuated to selectively place the fittings 12, 14, 16 in fluid communication with one another in various combinations. A first hollow projection 23 extends radially outward from the housing 18 and allows the endless advancement structure 20 to be inserted into the interior 19 of the housing. One or more second hollow projections 17 extend from the housing 18 for retaining portions of the endless advancement structure 20.

Referring to FIG. 4, the endless advancement structure 20 is positioned in the interior 19 between the inlet fitting 12 and outlet fittings 14, 16 to selectively divert and direct incoming fluid flow, e.g., water, from the inlet fitting 12 to one of the outlet fittings 14 or 16. In the illustrated example embodiments, the fluid flow supplied by the inlet fitting 12 is represented by reference letter B, while a first flow path or direction for fluid from the inlet fitting to the outlet fitting 14 is represented by reference letter C. A second flow path or direction from the inlet fitting 12 to the outlet fitting 16 is represented by reference character D. The endless advancement structure 20 may cooperate with the housing 18 such that only the first fluid path C or only the second fluid path D is opened at any given time.

Figure 5:
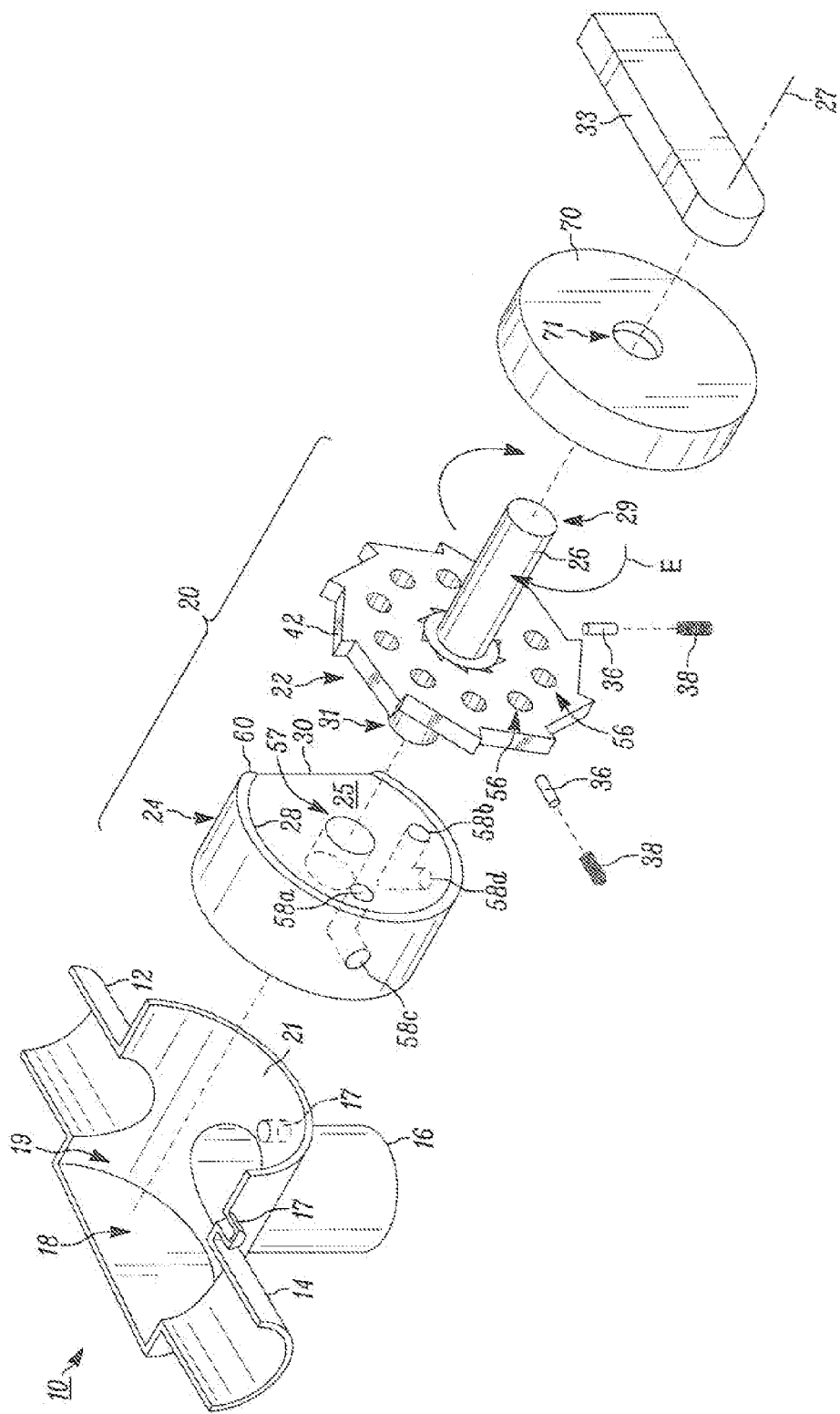
FIG. 5 is an exploded view of the diverter assembly of FIG. 1.

Referring to FIG. 5, the endless advancement structure 20 includes a stationary flow plate 24 fixed to the housing 18 and a gearing arrangement 22 rotatable within the housing 18 and connected to the flow plate. The gearing arrangement 22 is disc-shaped and secured to an axle 26 extending along an axis 27. The axle 26 extends from a first end 29 to a second end 31. An elongated handle 33 is connected to the first end 29 of the axle 26 for rotation thereof. The second end 31 of the axle 26 extends through the gearing arrangement 22 and is fixed for rotation therewith in a known manner. For example, one or more projections or keys (not shown) may extend radially outward from the axle 26 and mate with corresponding recesses (not shown) in the gearing arrangement 22 to prevent relative rotation between the axle and the gearing arrangement. In any case, rotation of the elongated handle 33 about the axis 27 rotates the axle 26 and the gearing arrangement 22 about the axis.

Figure 6:
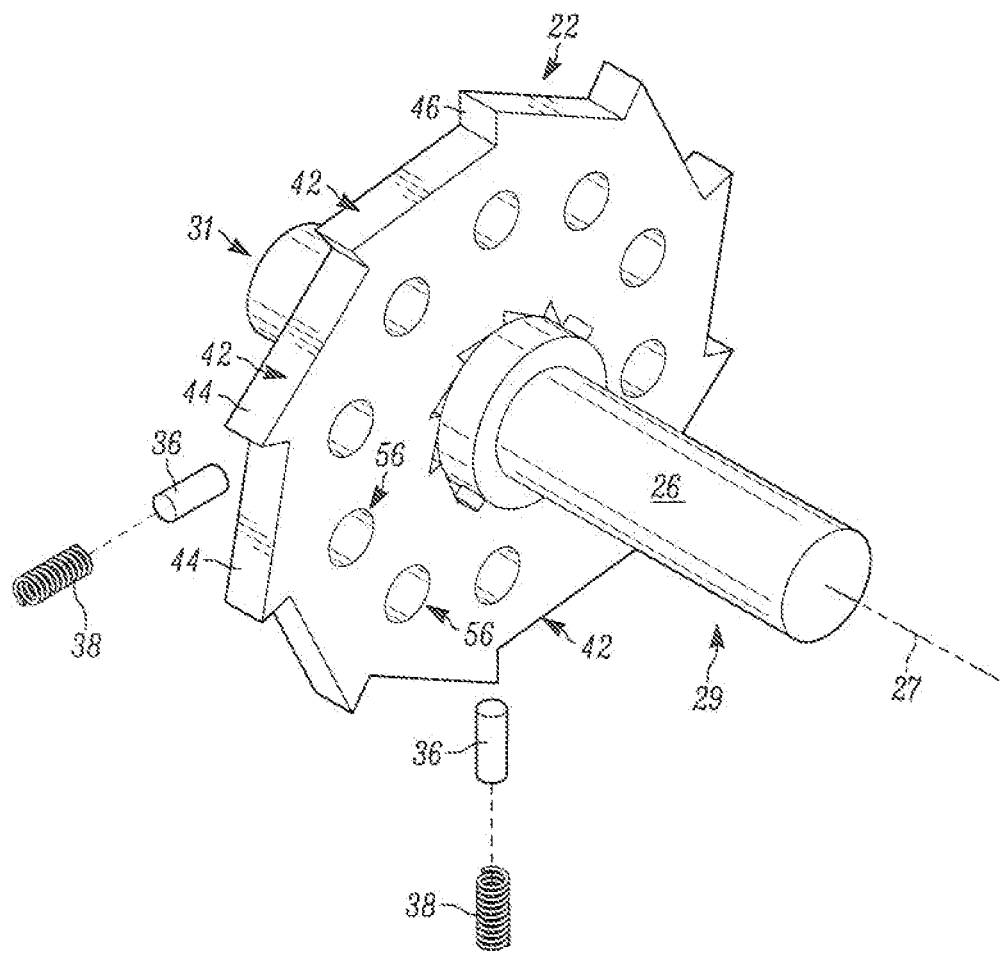
FIG. 6 is a perspective view of a gearing arrangement.

Referring further to FIG. 6, a plurality of cogs 42 extends from the outer periphery of the gearing arrangement 22. In one example, ten cogs 42 are spaced equally around the entire periphery of the gearing arrangement 22. It will be understood, however, that more or fewer cogs 42 may be provided on the gearing arrangement 22 in a symmetrical or asymmetrical manner. Each cog 42 includes an angled riser surface 44 that terminates at a catch surface 46 extending substantially perpendicular to the outer periphery, i.e., towards the axis 27. Each catch 46 faces the same direction, e.g., counterclockwise as shown in FIG. 6, around the outer periphery of the gearing arrangement 22.

A plurality of flow path openings or apertures 56 is formed in the gearing arrangement 22, with each aperture extending entirely through the gearing arrangement in a direction extending parallel to the axis 27. The flow path apertures 56 may have circular cross-sections and are arranged circumferentially about the axis 27 of the axle 26 in a symmetric pattern. It will be appreciated, however, that the flow path apertures 56 may have different shapes and/or sizes and/or be asymmetrically arranged about the axis 27. In one example, the flow path apertures 56 are equally spaced about the axis 27 with each flow path aperture being substantially aligned in the radial direction with a corresponding catch 46 of each cog 42. Although ten flow path apertures 56 are illustrated it will be appreciated that the gearing arrangement 22 may include more or fewer flow path apertures so long as the number of flow path apertures corresponds with the number of cogs 42 on the gearing arrangement.

Referring to FIG. 5, the flow plate 24 has a disc-shaped construction similar to the gearing arrangement 22 and includes a front surface 25 and an outer periphery 28. An opening 57 extends from the front surface 25 into the flow plate 24 and is configured to rotatably receive the second end 31 of the axle 26 on the gearing arrangement 22 via bearing or the like. The periphery 28 has a substantially round or C-shaped configuration that terminates at a planar end surface 30. Consequently, the periphery 28 and surface 30 collectively have a substantially D-shaped configuration. A seal or o-ring 60 may extend around the periphery 28 of the flow plate 24 for providing a fluid-tight connection between the periphery 28 and the interior of the wall 21 of the housing 18. The seal 60 may or may not also extend along the planar surface 30.

The flow plate 24 includes a first flow opening or aperture 58a and a second flow opening or aperture 58b. The first and second flow apertures 58a, 58b are spaced about 90° from one another circumferentially about the center of the flow plate 24. Neither of the flow apertures 58a, 58b is located adjacent the planar surface 30. Each flow aperture 58a, 58b extends from the front surface 25 of the flow plate 24, inwards towards the interior of the flow plate, and radially outward from the center to the outer periphery 28. Each flow aperture 58*a*, 58*b* terminates at a respective flow aperture 58*c*, 58*d* in the outer periphery 28. When the seal 60 is present, the flow apertures 58*a*, 58*b* extend entirely therethrough such that the flow apertures 58*c*, 58*d* are located in the seal. In any case, the flow apertures 58*a*, 58*b* may therefore have an L-shaped configuration. In one example, the flow apertures 58*a*, 58*b* terminate at positions along the outer periphery 28 that are about 90° from one another along the circumference of the flow plate 24.

The endless advancement structure 20 further includes a pair of pins or ratchet stops 36 and springs 38 that cooperate with the cogs 42 to allow rotation of the gearing arrangement 22 about the axis 27 relative to the flow plate 24 in one direction (clockwise as shown generally by the arrow E in FIG. 5) but restrict rotation of the gearing arrangement in the opposite direction (counterclockwise as shown in FIG. 5). The ratchet stops 36 and springs 38 are provided in the hollow projections 17 of the housing 18 such that the springs bias the ratchet stops radially inward into engagement with the cogs 42 on the gearing arrangement 22 (see also FIG. 8). The ends of the ratchet stops 36 that engage the cogs 42 may have the same contour as the riser surfaces 44 on the gearing arrangement 22.

The diverter assembly 10 further includes a cap 70 having a cylindrical shape that is configured for securing to the wall 21 of the housing 18 to enclose the endless advancement structure 20 within the interior 19 of the housing (see also FIG. 2). More specifically, the cap 70 extends over and is secured to the first projection 23 of the housing 18 in a fluid-tight manner to retain the endless advancement structure 20 therein. The cap 70 includes an opening 71 through which the axle 26 extends to allow the axle to extend out of the housing 18 and connect to the handle 33.

Figure 7:
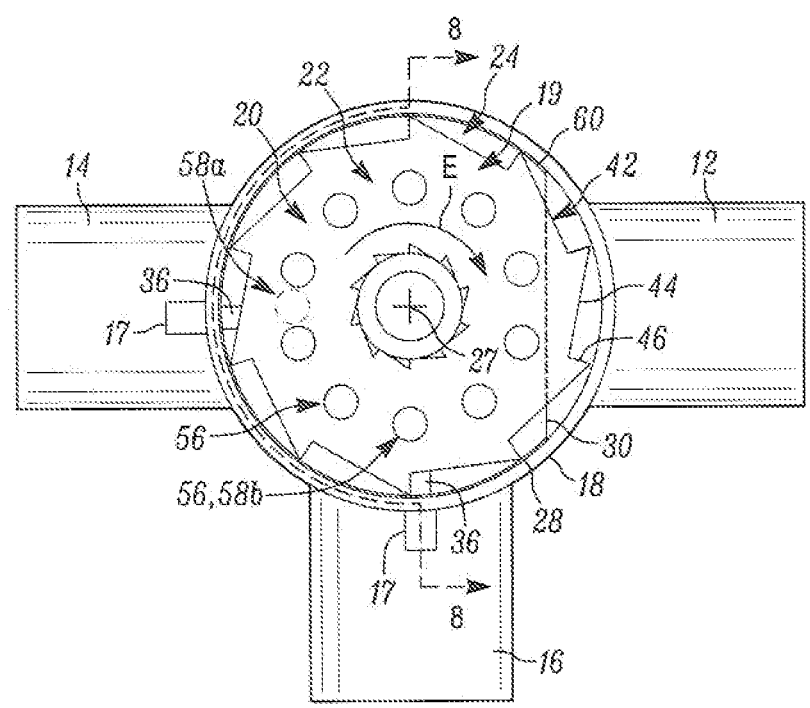
FIG. 7 is an assembly view of the diverter assembly illustrating the possible fluid flow paths therethrough.
Figure 8:
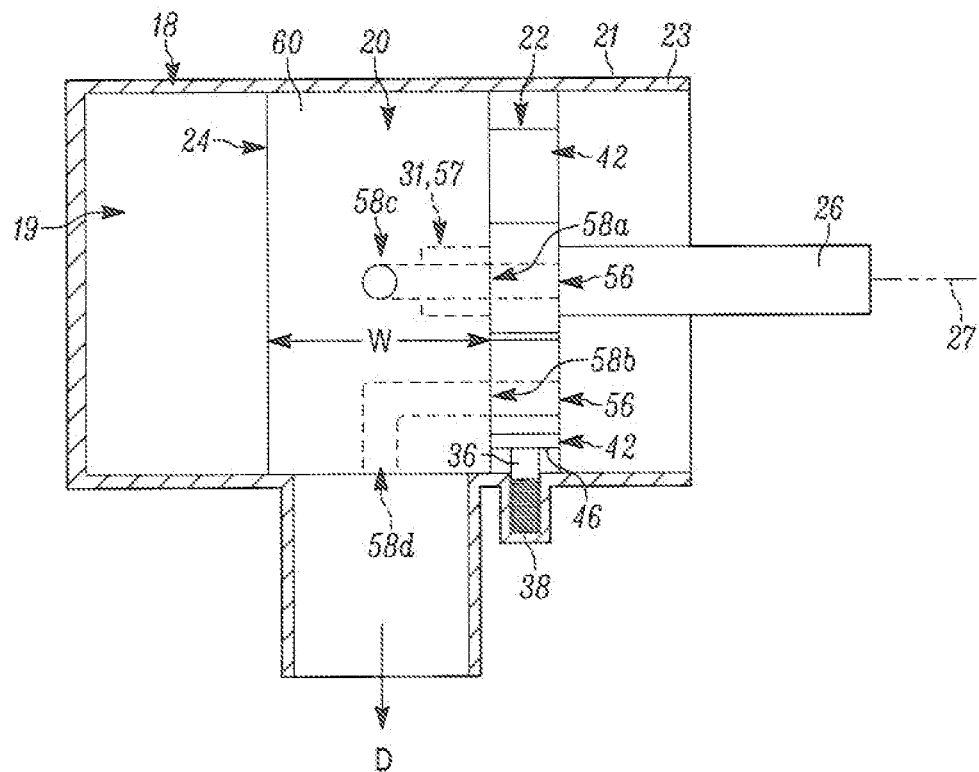
FIG. 8 is a sectional view of the diverter assembly taken along line 8-8 of FIG. 7.

Referring to FIGS. 7-8, the flow plate 24 is positioned within the interior 19 of the housing 18 such that the first flow aperture 58*a* is aligned with, e.g., extends towards, the first outlet fitting 14 and the second flow aperture 58*b* is aligned with the second outlet fitting 16. The flow plate 24 is fixed to the housing 18 and is immovable relative thereto. The outer periphery 28 of the flow plate 24 and the wall 21 of the housing 18 have substantially identical contours, e.g., circular, in the vicinity of the first and second fluid outlet fittings 14, 16. Furthermore, the flow plate 24 has a width, indicated generally by W1 in FIG. 8, that is greater than the width(s) or diameter(s) of the both fluid outlet fittings 14, 16. Consequently, the outer periphery 28 prevents fluid flow into the fluid outlet fittings 14, 16 other than through the flow apertures 58*a*, 58*b* aligned with the fluid outlet fittings. The planar surface 30, however, is spaced entirely from the inlet fitting 12 such that fluid may readily enter the interior 19 of the housing 18 from the inlet fitting.

The axle 26 and gearing arrangement 22 are rotatably connected to the flow plate 24 in the interior 19 of the housing 18. The gearing arrangement 22 and flow plate 24 are positioned coaxially with one another with the gearing arrangement located in front of the flow plate nearer the first projection 23 of the housing 18. The handle 33 is connected to the axle 26 for rotating the gearing arrangement 22 about the axis 27 relative to the flow plate 24. The gearing arrangement 22 and flow plate 24 cooperate to selectively route incoming fluid from the inlet fitting 12 to either the first outlet fitting 14 or the second outlet fitting 16. More specifically, rotation of the handle 33 in a single direction (clockwise in the direction indicated generally by E as shown in FIG. 7) rotates the flow apertures 56 of the gearing arrangement 22 relative to the flow apertures 58*a*, 58*b* of the flow plate 24. This rotation selectively aligns one of the flow apertures 56 with either the flow aperture 58*a* or the flow aperture 58*b* in an alternating manner. In other words, the flow apertures 56, 58*a*, 58*b* are positioned such that the flow apertures 56, 58*a* cannot be aligned with one another at the same time that the flow apertures 56, 58*b* are aligned with one another.

Figure 9:
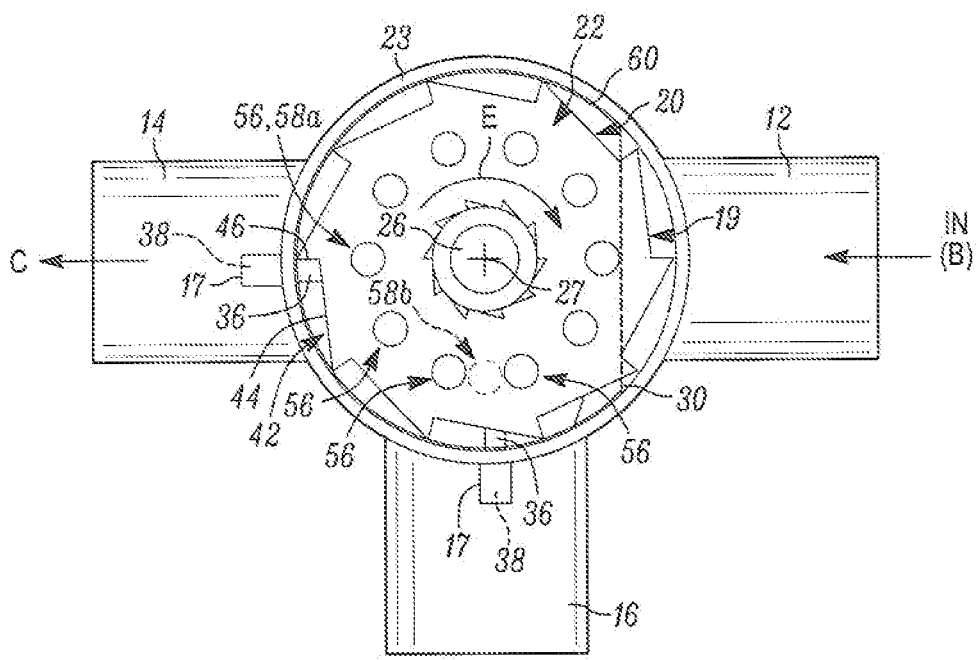
FIG. 9 is an assembly view of the diverter assembly illustrating a first fluid flow path through the device.
Figure 10:
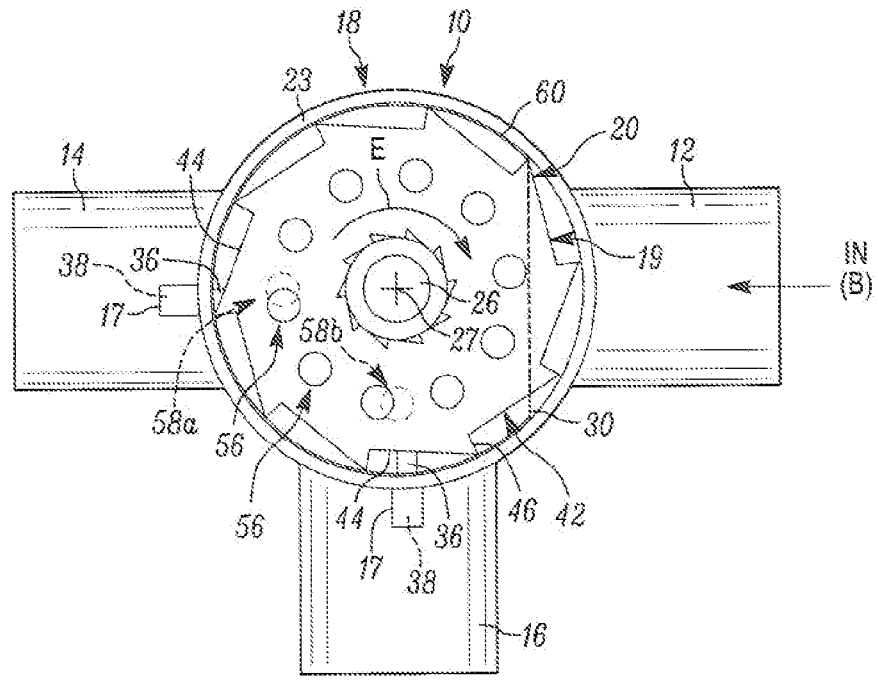
FIG. 10 is an assembly view of the diverter assembly during rotation of a gearing arrangement.
Figure 11:
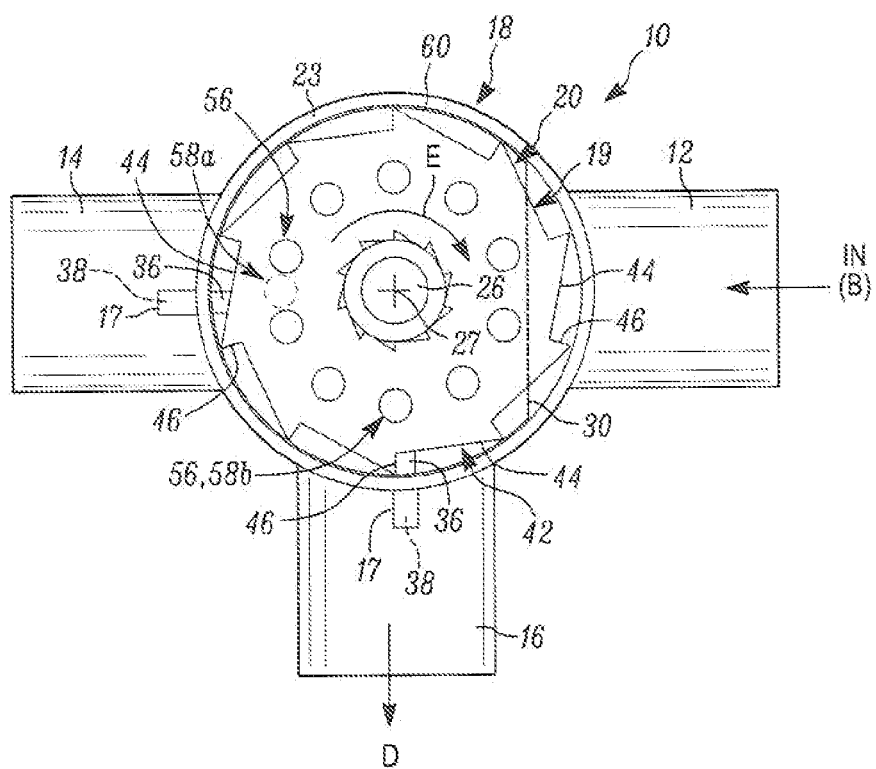
FIG. 11 is an assembly view of the diverter assembly illustrating a second fluid flow path through the device.

FIGS. 9-11 illustrate operation of the flow diverter 10 in accordance with an aspect of the present invention. Referring to FIG. 9, rotating the gearing arrangement 22 in the direction E to a condition in which the flow path apertures 56, 58*a* are aligned with one another forms a flow path between the inlet fitting 12 and the first outlet fitting 14. More specifically, the aligned flow path apertures 56, 58*a* complete a first flow path from the inlet fitting 12 to the interior 19 of the housing 18, through the flow path aperture 56 in the gearing arrangement 22, through the aligned flow path aperture 58*a* in the flow plate 24, through the flow aperture 58*c* in the periphery 28 of the flow plate, and to the first outlet fitting 14. This flow path therefore allows fluid to flow from the inlet fitting 12 in the direction B, through the endless advancement structure 20, and out the first outlet fitting 14 in the direction C. The flow apertures 56, 58*b* are not aligned with one another at this time and, thus, fluid is prevented from flowing to or through the second outlet fitting 16.

Referring to FIG. 10, further rotation of the gearing arrangement 22 in the direction E to the condition shown in FIG. 11 aligns the flow apertures 56, 58*b* to complete a second flow path from the inlet fitting 12 to the interior 19 of the housing 18, through the flow path aperture 56 in the gearing arrangement 22, through the aligned flow path aperture 58*b* in the flow plate 24, through the flow aperture 59*d* in the periphery 28 of the flow plate, and to the second outlet fitting 16. This flow path therefore allows fluid to flow from the inlet fitting 12 in the direction B, through the endless advancement structure 20, and out the second outlet fitting 16 in the direction D. The flow apertures 56, 58*a* are not aligned with one another at this time and, thus, fluid is prevented from flowing to or through the first outlet fitting 14.

The cogs 42 and ratchet stops 36 are configured and arranged such that the gearing arrangement 22 operates in an endless, indexing manner that alternates between directing fluid flow to the first outlet fitting 14 or to the second outlet fitting 16 as the gearing arrangement rotates in the direction E. More specifically, as the gearing arrangement 22 rotates in the direction E, the tapered riser surfaces 44 push each ratchet stop 36 radially outward against the bias of the respective spring 38 and further into the corresponding hollow projection 17. The ratchet stops 36 ride over the riser surfaces 44 of the cogs 42 until dropping off the catches 46 and engaging the next cogs, as would be appreciated by one of ordinary skill in the art.

Since, as noted, the flow apertures 56 are substantially radially aligned with the catches 46, the ratchet stops 36 become radially aligned with the flow apertures 56 when they engage the next cog immediately following dropping off the previous catch 46. The ratchet stops 36 are oriented about the gearing arrangement 22 such that radial alignment of one of the ratchet stops 36 with one of the flow apertures 56 aligns one of the flow apertures 56 with the flow aperture 58*a*. Similarly, radial alignment of the other ratchet stop 36 with one of the flow apertures 56 aligns one of the flow apertures 56 with the flow aperture 58*b*.

Only one ratchet stop 36 at a time, however, drops off a catch 46 to become radially aligned with a flow aperture 56 while the other ratchet stop is radially positioned roughly halfway between consecutive flow apertures 56 when the drop occurs, i.e., the other ratchet stop and the flow apertures 56 are misaligned. Rotation of the gearing arrangement 22 in the direction E therefore causes the ratchet stops 36 to separately become aligned and misaligned with one of the flow apertures 56 in an alternating manner with one another. In other words, the ratchet stops 36 cooperate with the catches 46 to index the gearing arrangement 22 at incremental rotational positions about the axis 27. Consequently, if there are "N" cogs 42 corresponding with N flow apertures 56 on the gearing arrangement 22 one of the ratchet stops 36 drops off or engages one of the catches 46 to align with one of the flow apertures 56 every (360/2N)° as the gearing arrangement rotates in the direction E.

In the example gearing arrangement 22 shown [having ten cogs 42 and flow apertures 56], this results in one of the ratchet stops 36 dropping off one of the catches 46 to become aligned with one of the flow apertures 56 every 18° of rotation of the gearing arrangement 22 in the direction E. Accordingly, in the example shown, one of the flow apertures 56 is aligned with either the flow aperture 58a or the flow aperture 58b every 18° of rotation of the gearing arrangement 22 in the direction E, with the alignment between flow apertures occurring in an alternating manner. One having ordinary skill in the art will readily appreciate that any degree of rotation can index the gearing arrangement 22 based upon the number of cogs 42, flow apertures 56, etc.

Engagement of the ratchet stops 36 with the cogs 42 provides audio and/or tactile feedback each time successive pairs of apertures 56, 58a or 56, 58b move into alignment with one another. Since the flow apertures 56 encircle the axis 27 of the gearing arrangement 22 the diverter assembly 10 of the present invention endlessly indexes the rotational position of the gearing arrangement in a manner that always aligns a pair of flow apertures 56, 58a or 56, 58b with one another when a ratchet stop 36 drops off a catch 46 no matter how many times the gearing arrangement is rotated by the handle 33. Consequently, with each indexing of the handle 33 and gearing arrangement 22 in the direction E, the water flow from the supply inlet 12 is diverted between the first flow path in the direction C to and through the first outlet fitting 14 (see FIG. 9) and the second flow path in the direction D to and through the second outlet fitting 16 (see FIG. 11).

The handle 33 may have a spring return (not shown) such that when the handle is rotated from its initial position (shown in solid in FIG. 2) to its final position relative to the housing (shown in phantom in FIG. 2) in the direction E, the handle bottoms out and automatically returns to the initial position. This allows the user to make a single change in the water or fluid flow from the first flow path C to the second flow path D or from the second flow path D to the first flow path C with a single actuation of the handle 33.

Single indexing of the gearing arrangement 22 by the handle 33 is further facilitated by the ratchet stops 36 being biased by the springs 38 against the sloped riser surfaces 44 of the gearing arrangement 22. In particular, the angled riser surface 44 cooperates with the ratchet stops 36 and springs 38 to bias the gearing arrangement 22 in the counterclockwise direction opposite the direction E until one of the ratchet stops engages one of the catches 46 to align that ratchet stop 36 with one of the flow apertures 56, thereby aligning either the flow apertures 56, 56a or the flow apertures 56, 56b with one another. The geometry of the catch 46 prevents the gearing arrangement 22 from rotating in a direction opposite the direction E once one of the ratchet stops 36 abuts a catch 46. Consequently, when the handle 33 is released the gearing arrangement 22 is always biased into a position in which one of the ratchet stops 36 releasably holds the rotational position of the gearing arrangement 22 such that one of the flow paths C or D is open. Moreover, it will be understood that once one of the ratchet stops 36 engages one of the catches 46 the fluid flowing through the aligned apertures 56, 56a, or 56, 56b will bias that ratchet stop into engagement with the catch and thereby help to maintain the desired flow path C or D in the open condition.

During operation, the user enables the flow of water by turning a valve (not shown) that provides water to the supply inlet 12 in the direction B. Water will then pass from the supply inlet 12 into the housing 18 to engage the gearing arrangement 22. The gearing arrangement 22 is positioned relative to the flow plate 24 such that water will be enabled to pass from the supply inlet 12 to either the first flow path C through the apertures 56, 58a and the flow aperture 58c or the second flow path D through the apertures 56, 58b and the flow aperture 58d. Upon actuation of the handle 33 by the operator, the gearing arrangement 22 may index one position such that flow path C is closed and the flow path D is opened.

Alternatively, it may be that upon actuation of the handle 33 by the operator, the gearing arrangement is indexed one position such that flow path D is closed and flow path C is opened. Through each indexing of the handle 33 and gearing 22, the flow paths alternate between the flow path C and the flow path D such that water is diverted, for example, between a showerhead 13 and a handheld spray wand 15 as would be appreciated by one of ordinary skill in the art. Since the gearing arrangement 22 can be advantageously actuated endlessly in the same direction by the handle 33, there is less wear and opportunity for leaks to occur between pathways, isolating any flow of water to the selected path by the operator. In addition, the endless advancement of the diverter assembly 10 allows the operator to quickly change between selected flow paths.

In an alternative example embodiment, endless advancement structure 20 may be configured to provide three or more flow paths through the diverter 10, e.g., by adding flow apertures to the gearing arrangement 22 and/or flow plate 24 and providing an appropriate number of cooperating ratchet stops 36 and cogs 42. These additional flow paths may operate any number of devices such as multiple showerheads, spray wands, a tub-filling spout and the like. Alternatively or additionally, the endless advancement structure 20 may be configured such that the gearing arrangement 22 includes a third position or condition relative to the flow plate 24 to block fluid flow to both the first and second outlet fittings 14, 16. The indexing by the handle 33 and gearing arrangement 22 to this position therefore acts to shut off the diverter assembly 10 to prevent the flow of water from the inlet fitting 12 to either flow path C, D. In such embodiment, the first index of the handle 33 would result in turning on water along the first flow path C, the next index would divert the flow path from the first flow path C to the second flow path D, and the third index of the handle would terminate the water flow through the housing 18. This cycle would be repeated endlessly as the handle 33 is turned in the direction E.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A diverter assembly for a shower tub arrangement that changes the distribution of water through two or more flow paths comprising:
 a housing having an inlet for receiving fluid and first and second outlets for discharging fluid from the housing;
 an endless advancement structure positioned within the housing and comprising a flow plate fixed to the housing and a gearing arrangement rotatable relative to the flow plate, the flow plate including a first opening in fluid communication with the first outlet in the housing and a second opening in fluid communication with the second outlet in the housing, the gearing arrangement including a plurality of third openings in fluid communication with the inlet of the housing; and
 a handle coupled to the gearing arrangement for selectively rotating the gearing arrangement in a single direction relative to the flow plate to alternate between placing the gearing arrangement in a first condition in which one of the third openings is aligned with the first opening in the flow plate and placing the gearing arrangement in a second condition in which one of the third openings is aligned with the second opening in the flow plate, the handle being rotatable in the single direction to a first angular position to place the gearing arrangement in the first condition and being further rotatable in the single direction to a second angular position different from the first angular position to place the gearing arrangement in the second condition.

2. The diverter assembly of claim 1, wherein placing the gearing arrangement in the first condition forms a first fluid flow path through one of the third openings the gearing arrangement and the first opening in the flow plate and placing the gearing arrangement in the second condition forms a second fluid flow path through one of the third openings in the gearing arrangement and the second opening in the flow plate.

3. The diverter assembly of claim 1 further comprising a plurality of projections arranged circumferentially around the gearing arrangement and a plurality of pins that cooperate with the projections for holding the gearing arrangement in either the first condition or the second condition.

4. The diverter assembly of claim 3, wherein the pins selectively engage and disengage the projections to provide tactile feedback when the gearing arrangement reaches one of the first condition and the second condition.

5. The diverter assembly of claim 3 further comprising a plurality of springs for biasing each of the pins into engagement with the gearing arrangement.

6. The diverter assembly of claim 1 further comprising a plurality of projections arranged circumferentially around the gearing arrangement and first and second pins positioned radially outward of the third openings that slide along the projections as the gearing arrangement rotates, each projection having a catch surface such that the first pin engages one of the catch surfaces to hold the gearing arrangement in the first condition, the second pin engaging one of the catch surfaces to hold to gearing arrangement in the second condition.

7. The diverter assembly of claim 6, wherein the second pin is spaced from all catch surfaces when the first pin engages one of the catch surfaces.

8. The diverter assembly of claim 1, the inlet being in fluid communication with a water supply pipe, the first outlet being in fluid communication with a pipe for supplying water to a showerhead, and the second outlet being in fluid communication with a pipe for supplying water to a handheld spray wand.

9. The diverter assembly of claim 1, wherein the third openings extend entirely through the gearing arrangement and are arranged circumferentially about an axis of the gearing arrangement while extending substantially parallel to the axis.

10. The diverter assembly of claim 1, wherein the flow plate includes a first surface facing towards the gearing arrangement and a peripheral surface, the first opening and the second opening each having an L-shape extending from the first surface to the peripheral surface.

11. The diverter assembly of claim 1, wherein the fluid is prevented from flowing to the second outlet when the gearing arrangement is in the first condition, the fluid being prevented from flowing to the first outlet when the gearing arrangement is in the second condition.

12. The diverter assembly of claim 1, wherein the flow plate is sized to prevent fluid flow to the first and second outlets other than through the first and second openings.

13. The diverter assembly of claim 1, wherein the gearing arrangement is rotatable through at least one revolution.

14. The diverter assembly of claim 1, wherein the gearing arrangement is rotatable by the handle to rotationally index the gearing arrangement relative to the flow plate.

15. The diverter assembly of claim 1, wherein rotation of the handle in the single direction moves the gearing arrangement from the first condition to the second condition, further rotation of the handle in the single direction moving the gearing arrangement from the second condition to the first condition.

16. The diverter assembly of claim 1, wherein the handle has the first angular position when the gearing arrangement is in the first condition, the second angular position when the gearing arrangement is in the second condition, and a third angular position different from the first and second angular positions when the gearing arrangement is moved from the second condition back to the first condition.

17. A diverter assembly for a shower tub arrangement that changes the distribution of water through two or more flow paths comprising:
 a housing having an inlet for receiving fluid and first and second outlets for discharging fluid from the housing;
 an endless advancement structure positioned within the housing and comprising:
 a flow plate fixed to the housing and having a first opening in fluid communication with the first outlet in the housing and a second opening in fluid communication with the second outlet in the housing;
 a gearing arrangement rotatable relative to the flow plate, the gearing arrangement including a plurality of third openings in fluid communication with the inlet of the housing and a plurality of projections, each projection including a radially extending catch surface; and
 first and second pins positioned in the housing radially outward of the third openings and biased into engagement with the gearing arrangement, engagement of the first pin with one of the catch surfaces placing the gearing arrangement in a first condition in which one of the third openings is aligned with the first opening in the flow plate, engagement of the second pin with one of the catch surfaces placing the gearing arrangement in a second condition in which one of the third openings is aligned with the second opening in the flow plate; and
 a handle coupled to the gearing arrangement for selectively rotating the gearing arrangement in a single direction relative to the flow plate to alternate between placing the gearing arrangement in the first condition and the second condition;

wherein rotation of the handle in the single direction to a first angular position moves the gearing arrangement from the first condition to the second condition, further rotation of the handle in the single direction to a second angular position different than the first angular position moving the gearing arrangement from the second condition to the first condition.

18. The diverter assembly of claim 17, wherein the handle has the first angular position when the gearing arrangement is in the first condition, the second angular position when the gearing arrangement is in the second condition, and a third angular position different from the first and second angular positions when the gearing arrangement is moved from the second condition hack to the first condition.

19. The diverter assembly of claim 17, wherein the second pin is spaced from all catch surfaces when the first pin engages one of the catch surfaces.

* * * * *